(No Model.)

R. W. FERGUSON.
JOINT FASTENER.

No. 281,854. Patented July 24, 1883.

Witnesses
Bradford Cross
S. S. Ewing

Inventor
Robert W. Ferguson
by L. P. Graham
attorney

UNITED STATES PATENT OFFICE.

ROBERT W. FERGUSON, OF DECATUR, ILLINOIS, ASSIGNOR TO WILLIAM H. ACUFF AND JAMES M. WISWELL, BOTH OF SAME PLACE.

JOINT-FASTENER.

SPECIFICATION forming part of Letters Patent No. 281,854, dated July 24, 1883.

Application filed February 11, 1882. (No model.)

*To all whom it may concern:*

Be it known that I, ROBERT W. FERGUSON, residing at Decatur, county of Macon, State of Illinois, have invented certain new and useful Improvements in Joint-Fasteners, of which the following is hereby declared to be a full, clear, and exact description.

Figure 1:
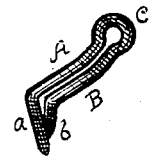
Figure 2:
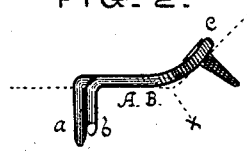
Figure 3:
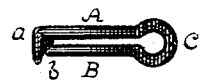
Figure 4:
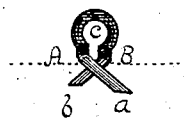
Figure 5:

Figure 1 of the drawings is a view in perspective, Fig. 2 a side view, Fig. 3 a top view, and Fig. 4 a front end view, of a joint-fastener made in accordance with my invention. Fig. 5 is a front end view, showing the position of the bent shanks of the fastener after being driven into the wood.

Joint-fasteners, as heretofore made from a single piece of wire or from stamped metal, have been provided with an eye for the fastening-screw, and with two shanks or legs, substantially parallel throughout, bent near their ends to conform to the joint of the parts united, and beveled at their points to cause the shanks to spread apart as they enter the wood. The fastener devised by me consists of a single piece of wire (or of stamped metal, if preferred) formed so as to have an eye, as at *c*, for the fastening-screw, and with two parallel shanks, A B, which, at the bent portions, as at *a b*, designed to be driven into the wood, are crossed over, so as to enter the wood contrawise to what would occur were the shanks made parallel throughout, as in the older forms of fastener. The points of the shanks are oppositely beveled, as shown. This crossing of the shanks, in conjunction with the opposite beveling of the points thereof—which latter feature is, however, not new of itself—causes the shanks, as they penetrate the wood, to describe a very devious course, curving and interlocking themselves about widely-separated portions of the woody fiber, and thus being so firmly embedded that they cannot be made to start under the severest stress to which the joint is subjected. Again, the crossing of the shanks tends to draw the main portions A B thereof close together at the first blow in driving, so that the fastener is more compacted, the shanks are forced home with more regularity and certainty, so that the work is done quickly, and the joint left not merely in better finish, but stronger, than the use of the older form could accomplish. The bent ends of the shanks may be barbed or notched, as at *e*, Fig. 5, to aid in holding the shanks in place.

What I claim as new, and desire to secure by Letters Patent, is—

1. The combination, with the parts joined, of a joint-fastener having bent crossed shanks the points of which are oppositely beveled, substantially as described.

2. The combination, with the parts joined, of a joint-fastener having an eye, *c*, and parallel shanks A B, the bent portions *a b* whereof are crossed and oppositely beveled, substantially as described.

ROBT. W. FERGUSON.

Attest:
   J. DE FRATUS,
   L. P. GRAHAM.